Sept. 14, 1937.　　　　C. B. MOORE　　　　2,093,119
CONTROL APPARATUS
Filed Oct. 9, 1936　　3 Sheets-Sheet 1
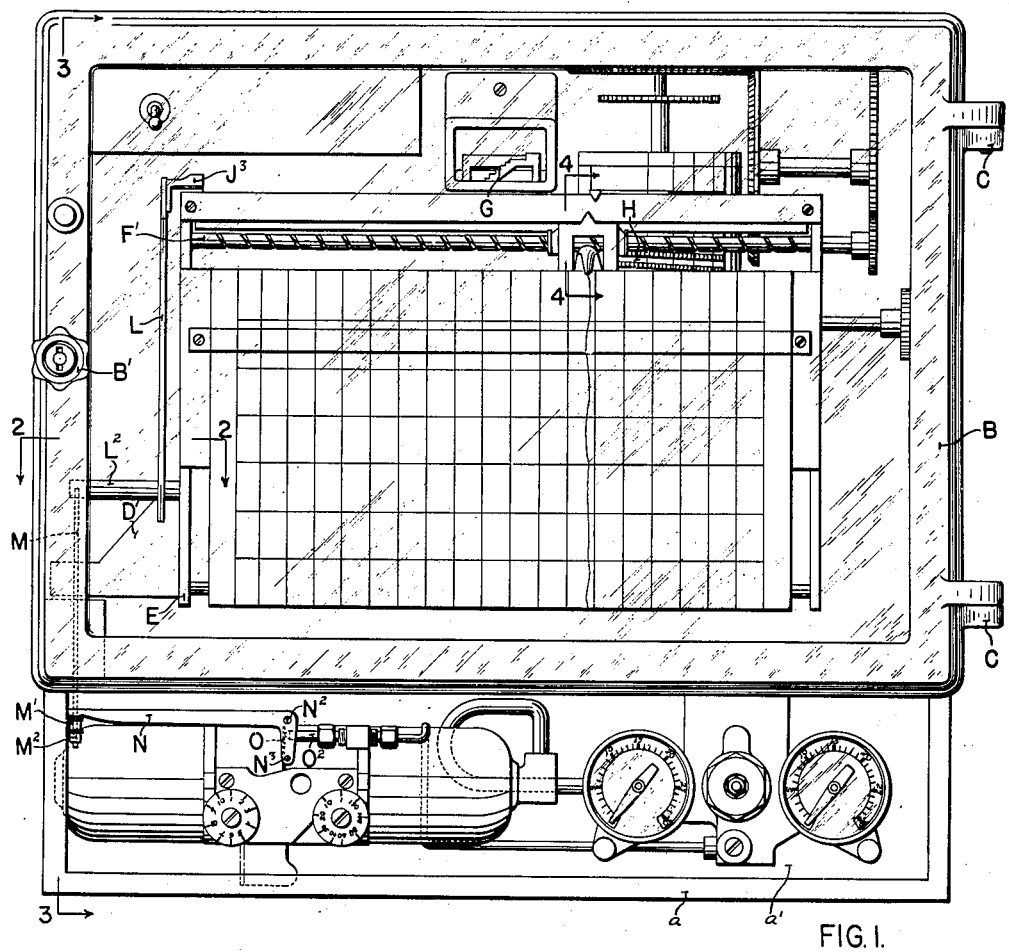
FIG. I.
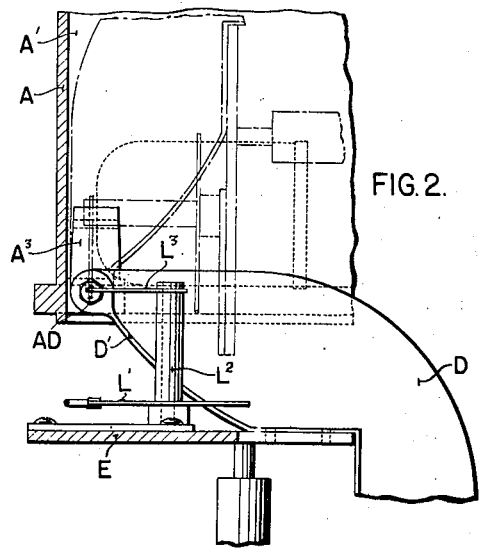
FIG. 2.
INVENTOR.
COLEMAN B. MOORE
BY
ATTORNEY.

Sept. 14, 1937. C. B. MOORE 2,093,119
CONTROL APPARATUS
Filed Oct. 9, 1936 3 Sheets-Sheet 2
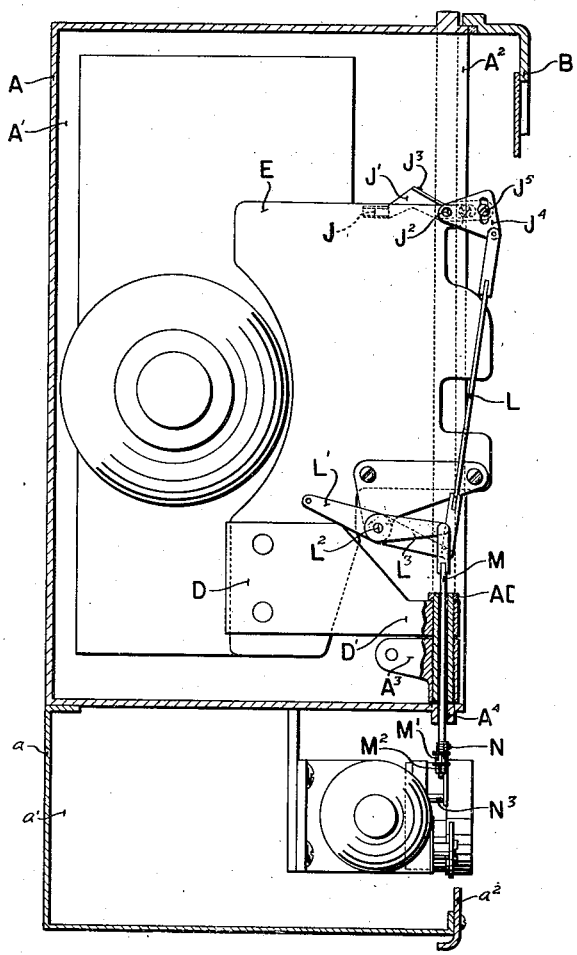
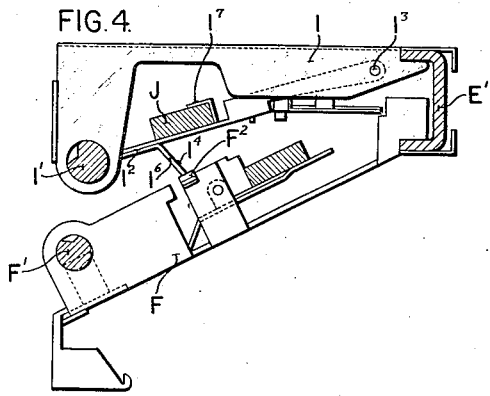
INVENTOR.
COLEMAN B. MOORE
BY
ATTORNEY.

Sept. 14, 1937.  C. B. MOORE  2,093,119
CONTROL APPARATUS
Filed Oct. 9, 1936   3 Sheets—Sheet 3
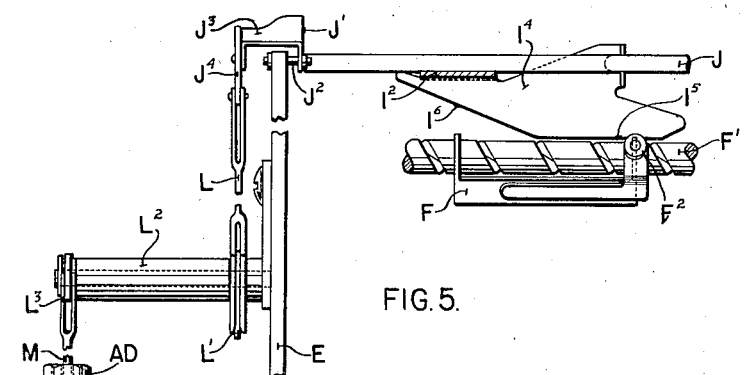
FIG. 5.
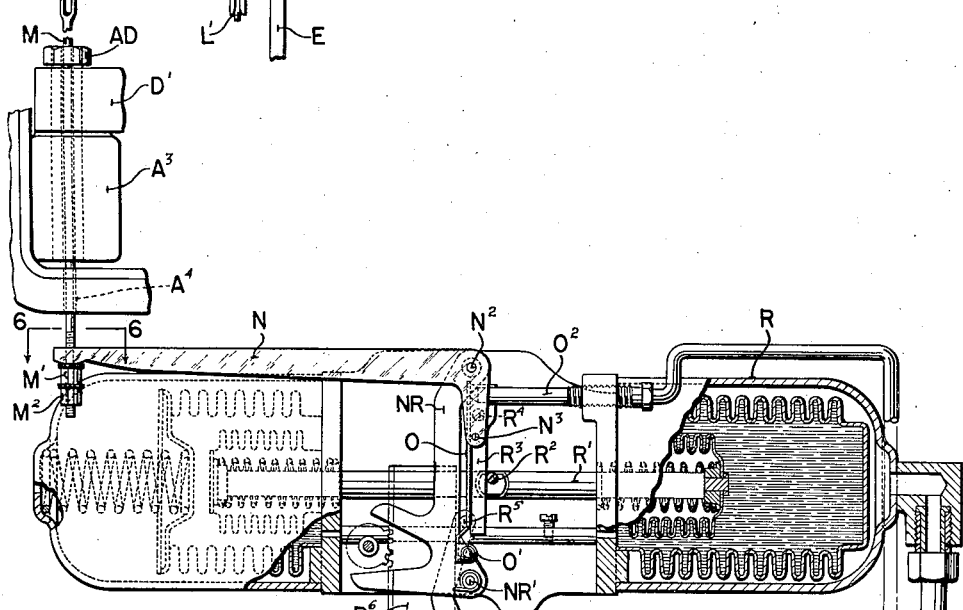
FIG. 6.
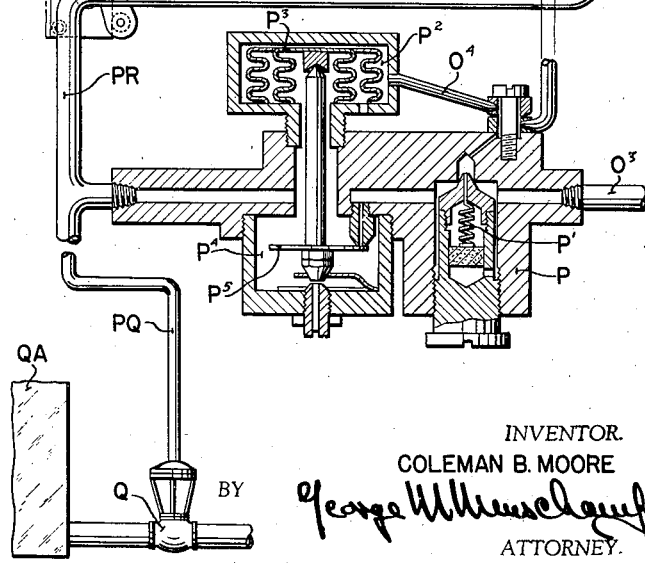
INVENTOR.
COLEMAN B. MOORE
BY
ATTORNEY.

Patented Sept. 14, 1937

2,093,119

UNITED STATES PATENT OFFICE 2,093,119

CONTROL APPARATUS

Coleman B. Moore, Carroll Park, Pa., assignor to The Brown Instrument Company, Philadelphia, Pa., a corporation of Pennsylvania Application October 9, 1936, Serial No. 104,779

3 Claims. (Cl. 236—1)

The general object of the present invention is to provide improved control apparatus of the type comprising a measuring and control instrument and a control mechanism, such as an air actuated controller, mechanically associated with and actuated by the instrument.

My invention was devised primarily for use in control apparatus comprising a commercial form of a potentiometric measuring and control instrument in which the instrument mechanism is mounted on a supporting arm hinge connected to the instrument casing in which the instrument mechanism is normally enclosed, but out of which the mechanism may be swung to make it accessible for inspection, cleaning, adjustment and repairs when the casing front door is opened.

The mechanical association with and actuation by such an instrument of an air actuated controller presents difficulties, because it is not practically feasible or desirable to mount the controller on the instrument supporting arm, and because there is no available space in an instrument casing of usual commercial form for an air actuated controller or analgous control apparatus, and it is undesirable, in many cases at least, to increase the size of the instrument casing proper to provide space therein for the control apparatus mechanically actuated by the instrument. Even though housed in a single casing structure, it is advantageous to locate the instrument and the control apparatus in separate compartments, which may be separately opened when access to the instrument mechanism, or to the control apparatus is desirable. Whether the instrument and connected control apparatus are housed in the same or separate compartments, the fact that the control apparatus does not share in the bodily movement of the instrument mechanism when the latter is swung into and out of the instrument casing, requires special connection provisions between the instrument and control apparatus for actuation of the latter.

In the preferred form of embodiment of the invention hereinafter illustrated and described in detail, the actuated control apparatus is mounted in a supplemental casing beneath, and supported by the instrument casing proper, and is actuated by the instrument through a mechanical connection including a link member extending through, and longitudinally movable in, an opening in the bottom wall of the instrument casing and an aligned axial passage formed in the pintle of the hinge connection between the instrument casing and the supporting arm for the instrument mechanism, the said link having a swivel connection at one end with the adjacent portion of the said mechanical connection. The various features of novelty which characterize the present invention are pointed out with particularity in the claims annexed hereto and forming a part of this specification. For a better understanding of the invention, however, its advantages and specific objects obtained with its use, reference should be made to the accompanying drawings in which I have illustrated and described a preferred form of embodiment of the invention:—

Fig. 1 is a front elevation of control apparatus including a pneumatic control mechanism external to a casing chamber normally receiving potentiometer measuring mechanism hingedly connected to the casing;

Fig. 2 is a partial section of the line 2—2 of Fig. 1, with the measuring mechanism supporting arm swung out of the chamber in which it is normally received;

Fig. 3 is a vertical section of the line 3—3 of Fig. 1;

Fig. 4 is a partial sectional elevation on the line 4—4 of Fig. 1;

Fig. 5 is a somewhat diagrammatic representation, with parts broken away and in section, of the pneumatic control mechanism and the means through which said mechanism is adjusted on a change in the value of the quantity measured; and Fig. 6 is a section on the line 6—6 of Fig. 5.

The apparatus shown in the drawings comprises a self-balancing recording potentiometer measuring and control instrument, normally received in the chamber A' of an instrument casing A of rectangular outline. The casing A is formed with a doorway A² at its front side, which is normally closed by a door B connected at one side to the casing body by hinge C. The door B is provided at its opposite side with a knob B', and is ordinarily provided with locking means including a keyhole in the knob B', for locking the door in its closed position. The apparatus shown in the drawings also comprises a so-called air actuated controller located in a casing compartment $a'$, directly beneath the chamber A'. The compartment $a'$ is closed at its upper end by the bottom wall of the casing A, and has its rear, bottom and end walls formed by a casing part $a$ detachably connected to the casing A. The front wall of the compartment $a'$ is formed by a removable panel or wall plate member, $a^2$.

The potentiometer instrument mechanism is mounted on a supporting arm D, which is normally within the chamber A', and is hinge connected to the casing body A adjacent the end of the space A' remote from the door hinges C. The hinge connection between the casing and supporting arm B, comprises overlapping hinge ears $A^3$ and $D^1$, carried by the casing body A and arm D, respectively, and a hinge pintle AD. The framework of the potentiometer instrument mechanism comprises main end plates or members E secured to the arm D and respectively adjacent to the opposite end walls of the space A when the arm D is within that space in the normal condition of the apparatus, illustrated in Figs. 1 and 3. When the door B is opened, the arm D and the instrument mechanism supported by it may be swung out of the casing as shown in Fig. 2.

The potentiometer instrument shown comprises a recorder carriage F movable horizontally between the end plates E in one direction and the other by the rotation of a helically grooved or screw threaded shaft F' journalled in the end plates E and in threaded engagement with the carriage F. A potentiometer instrument of the type shown, comprises a relay mechanism controlled by the deflection of a galvanometer pointer G for automatically adjusting a potentiometer measuring circuit resistance H when and as required to rebalance the measuring circuit, and for rotating the shaft F' to adjust the carriage F longitudinally of the shaft into positions corresponding to the different values of the quantity measured, and the variations of which produce deflections of the galvanometer pointer G. The mechanism by which the potentiometer measuring circuit is rebalanced and the shaft F' is rotated to adjust the carriage F, need not be further described herein as its particular form constitutes no part of the present invention, which is adapted for use with measuring and control instruments of very different forms. It is noted however, that the particular potentiometer instrument mechanism shown, is of the form employed in the "Brown potentiometer" instrument which is in extensive commercial use, and the characteristics of which, in the precise form herein illustrated, are disclosed in the pending application of Anker E. Krogh, Serial No. 75,704 filed April 22, 1936.

The control provisions of the instrument shown include a so-called control table I cooperating with the recorder carriage F. The table I is a sheet metal structure supported by a shaft I' and a guide rail or bar E', each parallel to the shaft F' and extending between and mounted in the end plates E. The guide rail E' also serves as a guide for the carriage F, as shown in Fig. 4. The control table I normally occupies a fixed position along the path of movement of the recorder carriage F, but may be adjusted along that path. To affect its adjustment, the shaft I' may be a rotatable helically grooved or threaded shaft in threaded engagement with the table I. A control member $I^2$ is pivotally connected at $I^3$ to the table I, to turn about an axis parallel to the shafts F' and I'. The part $I^2$ carries a lateral extension $I^4$, preferably detachably connected to the part $I^2$, and formed with an engaging edge which comprises a horizontal portion $I^5$ and an inclined portion $I^6$, and which normally rests on a supporting part $F^2$ of the carriage F. As shown the part $F^2$ is a roller.

As the recorder carriage F moves to the left, as seen in Fig. 5, no movement is given to the control table part $I^2$ so long as the horizontal edge portion $I^5$, is in engagement with the roller $F^2$, but as the roller $F^2$ moves away from the left hand end of the edge portion $I^5$, the control table part $A^2$ turns down, or counter-clockwise as seen in Fig. 4, under the action of gravity or other suitable bias force, to the extent permitted by the engagement of the inclined edge portion $I^6$, with the roller $F^2$. The normal control range of the instrument, in which its control effect varies with the position of the carriage F, is that required for movement of the roller $F^2$ in engagement with the edge portion $I^6$. When its movement to the left carries the roller $F^2$ out of engagement with the edge portion $I^6$, further down or counter-clockwise movement of the control table part $I^2$ is prevented by means hereinafter described.

The turning movement of the control table part $I^2$ about the axis of its pivotal connection $I^3$ with the table I, gives corresponding movement to a control bar J having its underside bearing against the control table part $I^2$ and prevented from separating from the latter by a guide part $I^7$. The control bar J extends between the two end plates E and is connected at its ends to arms J', each pivotally connected to the adjacent edge plate E by a pivot $J^2$ coaxial with the pivot $I^3$ for the control table part $I^2$. The left arm J', shown in Fig. 3, is provided with a transverse portion $J^3$ adapted to engage the upper edge of the adjacent end plate E, and thus arrest the down movement of the control bar J and control table part $I^2$, as the recorder carried roller $F^2$ moves to the left, as seen in Fig. 5, of the edge portion $I^6$. The arm J' shown in Fig. 3 is provided with an extension $J^4$ adjustable about the axis of the pivots $J^2$ relative to the body of said arm J', but normally secured rigidly to the latter by a clamping screw $J^5$ threaded into the arm J' and extending through a slot formed in the extension $J^4$.

The measuring and control instrument actuates the associated control apparatus, as hereinafter described, through a link L having its upper end pivotally connected to the extension $J^4$ at a distance from the common axis of the pivots $J^2$ and $I^3$, and having its lower end pivotally connected to the arm L' of a rocking element. The latter comprises a hub portion surrounding shaft $L^2$ carried by the adjacent member E. The rocking element has a second arm $L^3$ to which the upper end of a vertically disposed link M is pivotally connected. Advantageously the link M is in the form of a round bar or shaft and extends through an axial passage in the hinge pintle AD, and an opening $A^4$ in the bottom wall of the casing A and in register with said passage. The lower end of the link M carries an actuating abutment formed by a nut M', which is adjustably secured in place on the link by a lock nut $M^2$.

The vertical movements of the abutment $M^1$ give movements to the actuating elements N of the control apparatus located in the compartment a'. As shown, the actuating element N is a lever having a horizontally disposed arm formed with a slot N' at its free end through which the link M passes. The lever N has a gravitational bias for movement in the counter-clockwise direction, as seen in Fig. 5, so that its slotted end is supported by the abutment nut M' and follows the up and down movements of the latter. The connection between the link M and lever N is a swivel connection permitting rotative movement of the link relative to the lever N, when the supporting arm D with the instrument mechanism carried by it, is turned relative to the casing about the axis of its hinge connection therewith. The walls of the axial passage in the pintle AD and the opening A⁴ form guide or bearing surfaces for the link M preventing lateral displacement of the link. The guiding effect of those surfaces, while desirable, is not strictly essential, since with the connection between the upper end of the link and the extension J⁴ substantially in line with the axis of the hinge connection between the support D and casing A, there is no tendency to a significant lateral displacement of the link M.

The control apparatus through which the longitudinal movements of the link M produce control effects by giving movements to the actuating element N, may take various forms. As shown the control apparatus is an air actuated controller, of a form which is fully disclosed in the application of Coleman B. Moore, Serial No. 43,487, filed October 4, 1935, and is now in extensive commercial use. The lever N is pivoted at N² to an adjustable fulcrum member NR, in the form of a lever having a stationary fulcrum pivot NR'. The movements of the lever N produce control effects by moving a flapper valve O away from or permitting it to approach a nozzle or bleed orifice member O². The flapper valve O is mounted on a stationary pivot O' and is biased for movement in the direction in which it approaches and restricts the discharge through the nozzle O². The lever acts on the flapper O through a pin N³ carried by a depending arm of the lever.

The nozzle O² receives air from a pipe O³, supplying air at a suitable and approximately constant pressure, through a restricted passage formed by a small bore pipe P' included in a pilot valve mechanism P, so that the pressure in the nozzle O², which constitutes the primary control pressure of the control apparatus, increases and decreases as the flapper valve O moves toward and away from the nozzle. The primary control pressure is transmitted by a pipe O⁴ to a chamber P² of the pilot valve mechanism. One wall P³ of that chamber is movable, and separates the chamber P² from a second pilot valve chamber P⁴. The pressure in the latter is regulated by a valve P⁵ actuated by the said movable wall P³. The pressure in the chamber P⁵ is thus maintained in constant proportion to the primary control pressure in the chamber P², and constitutes the ultimate control pressure of the apparatus.

The ultimate control pressure is transmitted by a pipe PQ to the device to be controlled which as shown in Fig. 5, is a fluid pressure motor valve controlling the supply of fuel to a furnace QA, the temperature of which may be measured by the potentiometer measuring and control instrument in conjunction with a thermo-couple (not shown), responsive to furnace temperature, and connected to the instrument galvanometer. The ultimate control pressure is also transmitted by pipe PR to mechanism R, forming a part of the control apparatus, and adapted, following and as a result of each initial change in the ultimate control pressure, effected through link M, to give the lever NR an initial follow up adjustment, and a delayed compensating adjustment. The follow-up adjustment neutralizes a portion of the initial adjustment of the flapper valve O effected by the link M. The delayed compensating adjustment slowly neutralizes more or less of the effect of the preceding followup adjustment.

The mechanism R comprises bellows elements two of which are connected by a connecting rod R¹, which carries a projection R². The latter acts on lever NR through a lever R³ pivoted at R⁴, and a pin R⁵ interposed between the levers R³ and NR. The pin R⁵ is supported by a member R⁶ adjustable to vary the leverage with which the lever R³ acts on the lever NR. The latter is biased for movement in the clockwise direction, as seen in Fig. 5.

Details of the construction and operation of the mechanism R, not specifically referred to herein, will be understood by those skilled in the art from the drawings, and need not be desribced herein, particularly as that mechanism is not only fully disclosed in said prior application Serial No. 43,487, but is in extensive use. Moreover, as already stated, the particular form of the control apparatus actuated by the longitudinal movements of the link M, forms no part of the present invention, though it is an advantage of the present invention that it permits the ready combination with a measuring and control instrument of the character disclosed, with control apparatus of the relatively considerable bulk and type, of the control apparatus shown.

The apparatus illustrated is adapted for use, with little or no change, for many different purposes. In the use of the apparatus to measure the temperature in the furnace QA and to adjust the fuel supplied to the furnace as required to maintain that temperature approximately constant at some predetermined value, and on the assumption that the recorder carriage F is moved to the right or left as seen in Fig. 5, as the furnace temperature increases, and decreases, respectively, the normal operation of the apparatus is as follows:

With the furnace temperature at its normal value, the control table part F² will be in position to engage the edge portion I⁶ intermediate the ends of the latter. On an increase in the furnace temperature and corresponding movement of the recorder carriage F to the right, the bar J will be raised and the extension J⁴ will be turned clockwise as seen in Fig. 3. This will give a down movement to the link M, and will adjust the lever N counter clockwise, as seen in Fig. 5, whereupon the flapper valve O will move towards the nozzle O² and increase the primary and ultimate control pressures. The resultant increase in the pressure in the pressure chamber of the valve Q will give a closing adjustment to that valve, reducing the rate of fuel supply to the furnace and thereby tending to restore the temperature to its normal value. Conversely, on a decrease in the furnace temperature, the carriage F will move to the left, as seen in Fig. 5, and thereby give an up movement to the link M and an opening adjustment to the flapper valve O. The resultant reduction in the control pressures will produce an opening adjustment of the valve Q and an increase in the rate of fuel supply to the furnace, tending to restore the temperature of the latter to its normal value.

For an understanding of the present invention, it is not necessary to consider the modifications of the furnace control action effected by the mechanism R. When the furnace temperature is below the operating range, so that the roller F² is at the left of the edge portion I⁶ of the member I⁴, the valve Q will be fully open. When the furnace temperature is higher than the maximum control range temperature, the roller F² will be in engagement with the horizontal edge portion I⁵ of the member I⁴, and the valve Q will be fully closed, or at least will exert its maximum restrictive effect on the supply of fuel to the furnace.

The invention is adapted for use with any control instrument including mechanism mounted on the arm D, or on an analogous hinged support, and adapted to produce control effects by giving longitudinal movements to a link, which like the link M, is coaxial with the hinged connection between the instrument casing and mechanism support, and is free to rotate relative to the apparatus to which it is connected at one end or the other, when the support is turned relative to the instrument casing and thereby gives bodily movement to the control instrument relative to the control apparatus. As will be apparent, the link M is not necessarily coaxial in the strict mathematical sense, with the hinge connection between the casing A and support D. It is practically essential, however, that the link M be so disposed that the turning movements of the arm D will not disturb the operative relation of the link with the parts connected by it. While it is ordinarily convenient to locate the control apparatus beneath the instrument casing as shown, the control apparatus may be supported above the casing top wall, in which case the latter is formed with the opening A⁴ for the passage of the link M.

While in accordance with the provisions of the statutes, I have illustrated and described the best form of embodiment of my invention now known to me, it will be apparent to those skilled in the art that changes in form may be made without departing from the spirit of my invention as set forth in the appended claims, and that in some cases, certain features of my invention may be used to advantage without a corresponding use of other features.

Having now described my invention, what I claim as new and desire to secure by Letters Patent is:

1. The combination with an instrument casing, of a mechanism support, a hinge connection between said support and casing, a link element in substantial alignment with the axis of said hinge connection for movements in the direction of said axis, control apparatus supported in fixed bodily relation with said casing and operatively connected to one end of said link and adjusted to produce control effects by the said movements of said link, and control instrument mechanism mounted on said support and bodily movable with the latter relative to said casing about said axis and operatively connected to the second end of said link and adapted to give the latter movements in the direction of said axis.

2. The combination with an instrument casing, of an instrument support, a hinge connection between said support and casing formed with an axial passage, a link element extending through and longitudinally movable in said passage, control apparatus supported in fixed bodily relation with said casing and operatively connected to one end of said link and adjusted to produce control effects by longitudinal movements of said link, and an instrument mechanism mounted on said support and bodily movable with the latter relative to said casing, about the axis of said hinge connection and operatively connected to the second end of said link and adapted to give the latter longitudinal control actuating movements.

3. Apparatus as specified in claim 1 in which the control apparatus is external to and supported by said casing and in which the casing is formed with a wall opening in alignment with the hinge connection axis and through which the end of said link connected to the control apparatus protrudes.

COLEMAN B. MOORE.